US012055047B2

(12) United States Patent
Klötzer

(10) Patent No.: US 12,055,047 B2
(45) Date of Patent: Aug. 6, 2024

(54) SEAL CARRIER FOR A TURBOMACHINE, HAVING SLOT-LIKE OPENINGS IN THE SEAL BODY

(71) Applicant: MTU Aero Engines AG, Munich (DE)

(72) Inventor: Alexander Klötzer, Munich (DE)

(73) Assignee: MTU Aero Engines AG, Munich (DE)

( * ) Notice: Subject to any disclaimer, the term of this patent is extended or adjusted under 35 U.S.C. 154(b) by 47 days.

(21) Appl. No.: 17/781,219

(22) PCT Filed: Dec. 1, 2020

(86) PCT No.: PCT/DE2020/000298
§ 371 (c)(1),
(2) Date: Nov. 23, 2022

(87) PCT Pub. No.: WO2021/110191
PCT Pub. Date: Jun. 10, 2021

(65) Prior Publication Data

US 2023/0127895 A1 Apr. 27, 2023

(30) Foreign Application Priority Data

Dec. 6, 2019 (DE) ..................... 10 2019 219 090.1

(51) Int. Cl.
*F01D 11/12* (2006.01)

(52) U.S. Cl.
CPC ...... *F01D 11/127* (2013.01); *F05D 2220/323* (2013.01); *F05D 2240/55* (2013.01); *F05D 2250/283* (2013.01)

(58) Field of Classification Search
CPC .... F01D 11/127; F01D 11/122; F01D 11/125; F05D 2250/283
See application file for complete search history.

(56) References Cited

U.S. PATENT DOCUMENTS 4,161,231 A 7/1979 Wilkinson
5,743,488 A 4/1998 Rolston et al.
(Continued)

FOREIGN PATENT DOCUMENTS

DE 10305899 A1 8/2004
DE 102010062087 A1 5/2012
(Continued)

OTHER PUBLICATIONS

Goehler, DE102010062087 machine translation, 2012 (Year: 2012).*
(Continued)

*Primary Examiner* — Justin D Seabe
*Assistant Examiner* — Michael K. Reitz
(74) *Attorney, Agent, or Firm* — Hinckley, Allen & Snyder, LLP; David R. Josephs

(57) ABSTRACT

The invention relates to a seal carrier for a turbomachine, in particular a gas turbine, having a carrier base and at least one seal body, wherein the at least one seal body is connected to the carrier base, and wherein the at least one seal body is formed by a plurality of cavities arranged next to one another, in particular uniformly, in the peripheral direction and in the axial direction, wherein the cavities extend out from the carrier base in the radial direction and are delimited by a cavity wall. According to the invention, the seal body has a plurality of damping portions which are designed to locally damp or disrupt the flow of force in the seal body, wherein the carrier base is continuous in the region of the damping portions.

7 Claims, 5 Drawing Sheets

(56) References Cited

U.S. PATENT DOCUMENTS

| | | | |
|---|---|---|---|
| 6,544,623 | B1 | 4/2003 | Straza |
| 2005/0266207 | A1 | 12/2005 | Ohara |
| 2018/0258784 | A1 | 9/2018 | Schlothauer et al. |

FOREIGN PATENT DOCUMENTS

| | | | | | |
|---|---|---|---|---|---|
| DE | 102015216208 | A1 | | 3/2017 | |
| EP | 1254968 | A1 | | 11/2002 | |
| EP | 2338676 | B1 | | 11/2014 | |
| EP | 3375980 | A1 | | 9/2018 | |
| FR | 2913718 | A1 | * | 9/2008 | .............. F01D 11/08 |
| FR | 3028882 | A1 | * | 5/2016 | ............ F01D 11/125 |
| FR | 3072413 | A1 | * | 4/2019 | ............ F01D 11/122 |
| FR | 3095833 | A1 | * | 11/2020 | ............ F01D 11/127 |
| JP | 2010100046 | A | | 5/2010 | |
| JP | 2016027287 | A | | 2/2016 | |

OTHER PUBLICATIONS

Amoedo, Machine Translation of FR3072413, (Year: 2019).*
Le Biez, Machine Translation of FR3028882 (Year: 2016).*
Bouillon, Machine Translation of FR2913718 (Year: 2008).*
Lameignere, Machine Translation of FR3095833, 2019 (Year: 2019).*

* cited by examiner

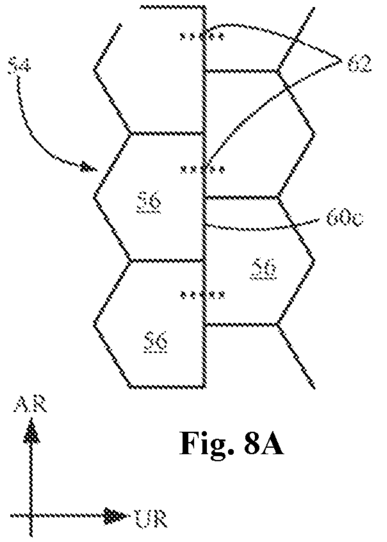
Fig. 8A
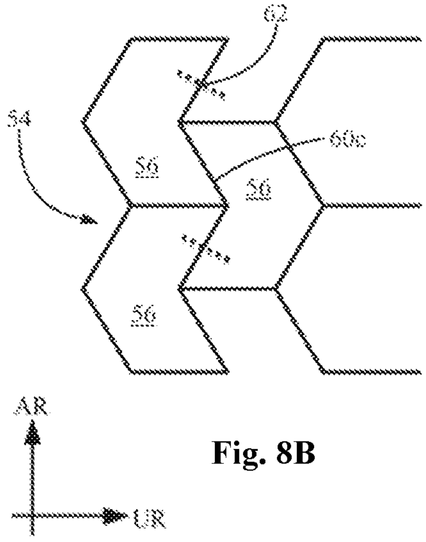
Fig. 8B
Fig. 9
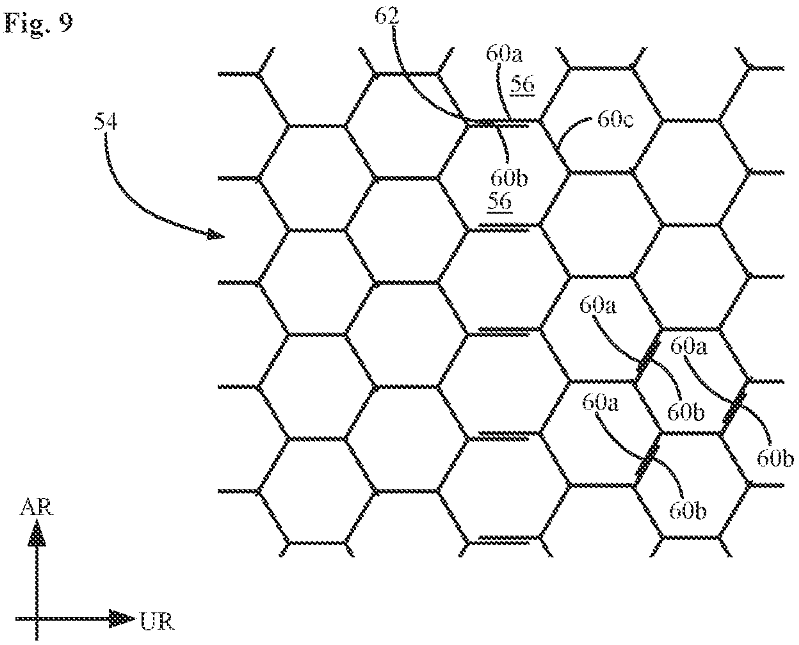

SEAL CARRIER FOR A TURBOMACHINE, HAVING SLOT-LIKE OPENINGS IN THE SEAL BODY

BACKGROUND OF THE INVENTION

The present invention relates to a seal carrier for a turbomachine, in particular a gas turbine, comprising a carrier base and at least one seal body, wherein the at least one seal body is connected to the carrier base, and wherein the at least one seal body is formed by a plurality of cavities arranged next to one another, in particular uniformly, in the peripheral direction and in the axial direction, wherein the cavities extend out from the carrier base in the radial direction and are delimited by a cavity wall.

Directional indications such as "axial" or "axially", "radial" or "radially", and "peripheral" are basically to be understood as referred to the machine axis of the turbomachine or gas turbine, as long as nothing is indicated to the contrary explicitly or implicitly from the context.

A seal carrier is known from EP 3 375 980 A1, which is formed from a plurality of carrier segments having a respective honeycomb-shaped seal body. At the transitions from one carrier segment to an adjacent carrier segment, a parting line is provided, which extends over the entire axial length of the seal carrier. Such a parting line makes possible a compensation for deformations of the seal carrier and of the honeycomb-shaped seal body due to temperature gradients during operation of the gas turbine. Of course, a parting line that extends over the entire axial length has the disadvantage that the sealing effect is not very good in this region.

SUMMARY OF THE INVENTION

The object that is viewed as the basis of the invention is to present a seal carrier, in which deformations based on temperature gradients are reduced while essentially retaining the same sealing effect.

This object is achieved by the present invention. Advantageous embodiments with appropriate enhancements are discussed in detail below.

Thus, a seal carrier is proposed for a turbomachine, in particular a gas turbine, the seal carrier comprising a carrier base and at least one seal body, wherein the at least one seal body is connected to the carrier base, and wherein the at least one seal body is formed by a plurality of cavities arranged next to one another, in particular uniformly, in the peripheral direction and in the axial direction, wherein the cavities extend out from the carrier base in the radial direction and are delimited by a cavity wall. It is therefore provided that the seal body has a plurality of damping portions that are designed for the purpose of locally damping or disrupting the flow of force in the seal body, wherein the carrier base is designed as continuous in the region of the damping portions.

Due to the provision of damping portions in the seal body, a flow of force that occurs particularly in the peripheral direction can be damped or reduced, so that a deformation of the entire seal carrier can be counteracted during operation of the gas turbine. By the provision of damping portions in the seal body, a disruption or weakening of the carrier base can be avoided, an issue that is known, for example, from the above-mentioned prior art having the parting line.

The damping portions can be designed as slot-like openings that are provided for at every two adjacent cavities in such a way that these two adjacent cavities stand together in fluid connection over the relevant opening.

By providing slot-shaped openings in the seal body, the flow of force can be influenced inside the seal body, particularly in the peripheral direction, so that deformations due to thermal gradients can be prevented or reduced. The slot-shaped openings, however, in each case, can be designed or dimensioned such that the fluid connection that is formed thereby between the cavities has little or no influence on the sealing effect of the seal carrier that is to be achieved.

The slot-shaped opening can be provided in a wall segment of the cavity wall that forms a common partition wall between the two adjacent cavities. The slot-shaped opening can extend radially outward proceeding from a radially inner-lying edge of the wall segment. In this case, in the radial direction, the slot-shaped opening can have a slot length that is shorter than the radial height of the wall segment, particularly approximately 70% to 99% of the radial height, or is of the same size as the radial height. Such a slot-shaped opening can be produced, for example, by means of spark erosion processing (also known as electrical discharge machining (EDM)), e.g., by means of a correspondingly dimensioned wire. The slot-shaped openings in this case can have a width in the range of a few hundredths of a millimeter, so that the slot-shaped openings have almost no influence on the sealing effect of the seal body.

The openings can be arranged distributed on the seal body in such a way that a cavity stands in fluid connection with only a single adjacent cavity.

Alternatively, the openings can be arranged distributed on the seal body in such a way that a cavity stands in fluid connection with at least two adjacent cavities.

Further, the openings can be arranged distributed on the seal body in such a way that there is a plurality of adjacent cavities, between which a continuous wall segment is formed, so that these adjacent cavities do not stand in fluid connection with one another.

The arrangement or distribution of the slot-shaped openings can be produced in this way with respect to the entire seal body, particularly from the viewpoint of the above-mentioned reduction in deformations based on temperature gradients.

According to an alternative embodiment, the damping portions can be formed by two parallelly arranged and overlapping wall segments of two adjacent cavities. In other words, a type of opening or slot also can be designed between the overlapping wall segments, so that even in this case, the adjacent cavities stand in fluid connection with one another.

It is also conceivable to configure the damping portions so that the seal body has a greater elasticity in the region of the damping portions, so that the flow of force occurring in the seal body due to elastic expansion of the damping portions can be reduced or damped. In such a case, the flow of force is thus not disrupted locally in the region of the damping portions, but is at least partially absorbed by the more elastic design of the damping portions.

The carrier base and the seal body can be designed as semicircular-shaped sealing segments, wherein two sealing segments form a circumferential seal.

The production or preparation of an above-described seal carrier or/and a seal body can also be achieved by means of additive manufacturing methods. In this case, in particular, the slot-shaped openings in the seal body can also be manufactured in a simple way by additive manufacturing methods.

A gas turbine, particularly an aircraft gas turbine having at least one rotating blade ring, can comprise at least one above-described seal carrier that is arranged around the rotating blade ring.

BRIEF DESCRIPTION OF THE DRAWING FIGURES

The invention will be described below with reference to the attached figures by way of example and not in any limiting manner.

FIGS. 8A and 8B show, in a simplified schematic illustration, the arrangement of slot-shaped openings in a seal body, wherein the cavities have different shapes, respectively, pentagonal cavities and notched directional arrows.

FIG. 9 shows, in a simplified schematic illustration. the arrangement of damping portions by way of overlapping wall segments in a seal body.

DESCRIPTION OF THE INVENTION

Figure 1:
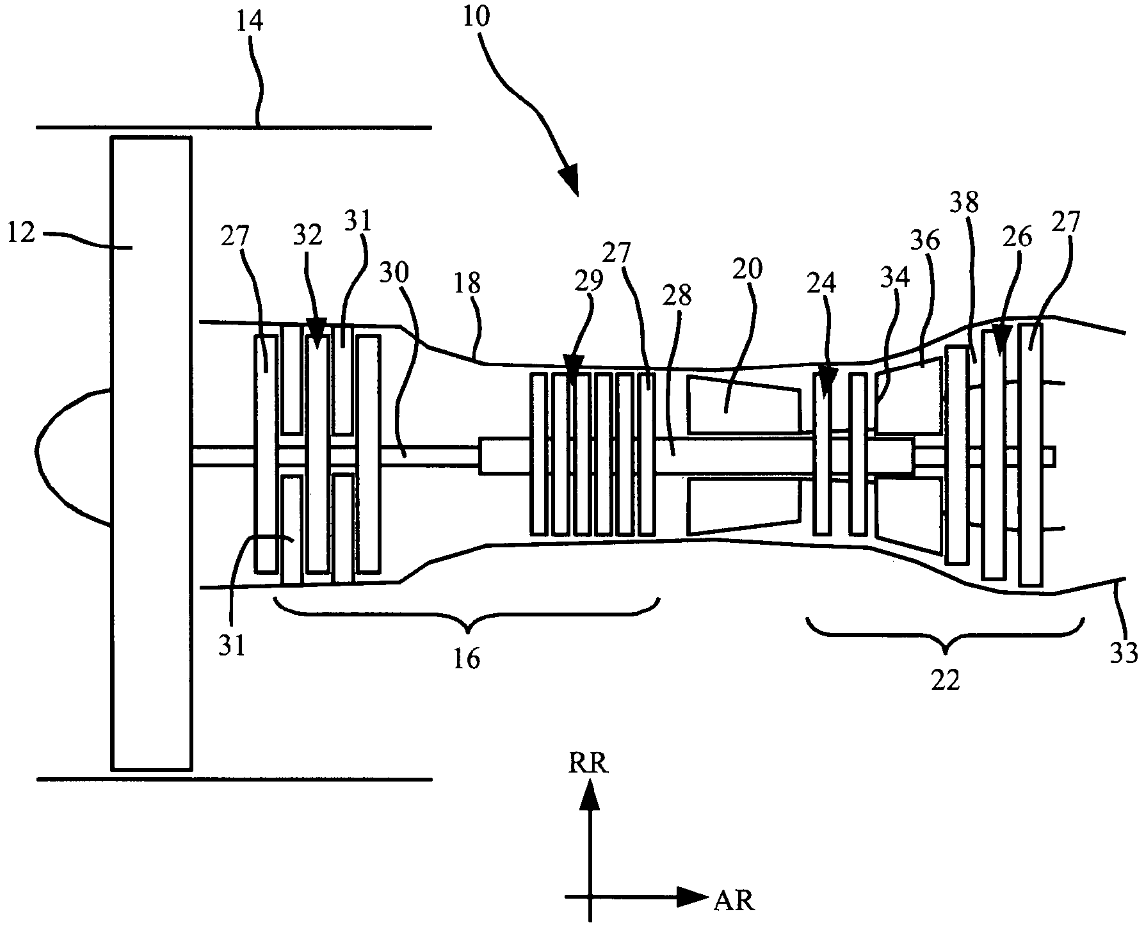
FIG. 1 shows, in a simplified schematic illustration, a diagram of an aircraft gas turbine.

FIG. 1 shows, in a schematic and simplified illustration, an aircraft gas turbine 10, which is illustrated as a turbofan engine purely by way of example. The gas turbine 10 comprises a fan 12, which is surrounded by a jacket 14, which is simply indicated. In the axial direction AR of the gas turbine a compressor 16 is connected to the fan 12, said compressor being accommodated in an inner housing 18, which is simply indicated, and can be defined as a single stage or a multistage compressor. The combustion chamber 20 is connected to the compressor 16. Hot exhaust gas streaming out from the combustion chamber then flows through the subsequently connected turbine 22, which can be designed as a single-stage or multistage turbine. In the present example, the turbine 22 comprises a high-pressure turbine 24 and a low-pressure turbine 26. A hollow shaft 28 connects the high-pressure turbine 24 to the compressor 16, particularly to a high-pressure compressor 29, so that these latter are driven or rotated jointly. In the radial direction RR of the turbine, a further inner-lying shaft 30 connects the low-pressure turbine 26 to the fan 12 and to a low-pressure compressor 32, so that these latter are driven or rotated jointly. A thruster 33, which is only indicated here, is subsequently connected to the turbine 22.

In the illustrated example of an aircraft gas turbine 10, a turbine midframe 34 is arranged between the high-pressure turbine 24 and the low-pressure turbine 26, and this midframe is arranged around the shafts 28, 30. In its radially outer region 36, hot exhaust gases from the high-pressure turbine 24 flow through the turbine midframe 34. The hot exhaust gas then reaches into an annular space 38 of the low-pressure turbine 26. By way of example, rotating blade rings 27 from compressors 29; 32 and turbines 24, 26 are illustrated. Guide vane rings 31 that are usually present are indicated only in the compressor 32 by way of example, for reasons of an overview.

The following description of an embodiment of the invention relates, in particular, to the high-pressure turbine 24 or the low-pressure turbine 26, in which the rotating blade rings 27 can be surrounded by the seal carriers described in the following.

Figure 2:
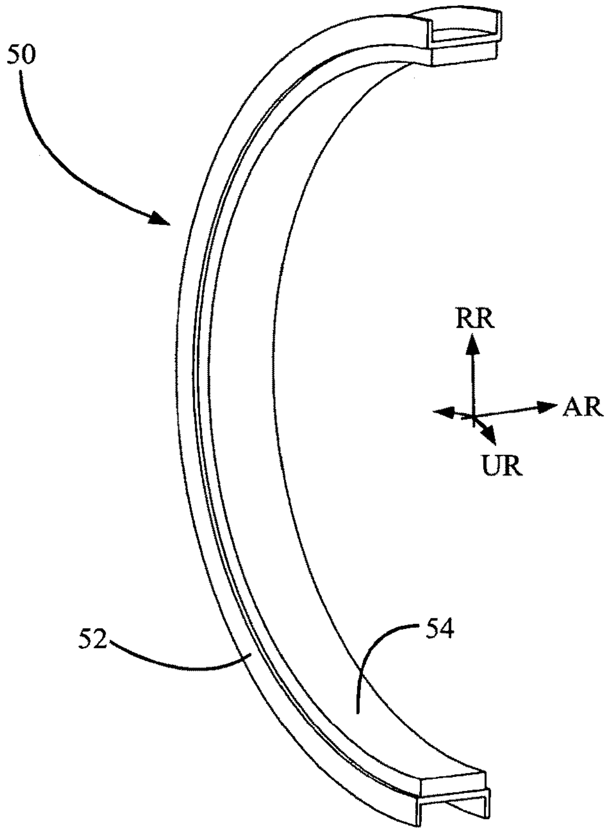
FIG. 2 shows, in a simplified schematic illustration, a perspective representation of a seal carrier.

FIG. 2 shows a seal carrier 50 in a simplified and schematic perspective illustration. The seal carrier 50 comprises a carrier base 52 and a seal body 54. The seal carrier 50 is shown here as a semicircular shape by way of example. According to such an embodiment, a seal arrangement that surrounds a rotating blade ring can be created by two seal carriers 50 of this type.

Figure 3:
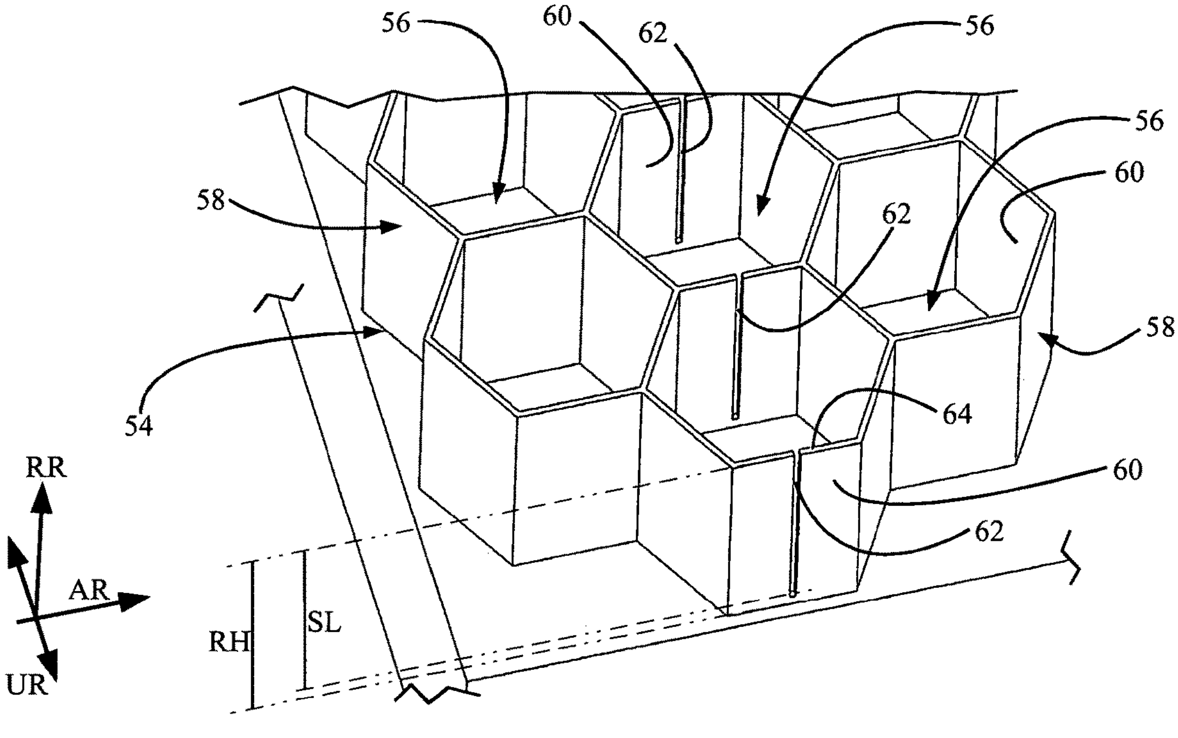
FIG. 3 shows, in a simplified schematic illustration, a partial perspective presentation of a seal body with cavities and slot-shaped openings as damping portions.

The seal body 54 is shown by way of example and as an excerpt in FIG. 3. The seal body 54 comprises a plurality of cavities 56 arranged adjacent to one another in the peripheral direction UR or axial direction AR. The cavities 56 extend out from the carrier base 52 in the radial direction RR inward. The cavities 56 are delimited by a respective circumferential cavity wall 58. Each cavity wall 58 is formed by a plurality of wall segments 60. In the example shown, the cavity walls 58 are arranged to form a honeycomb or hexagonal shape.

In order to prevent deformations of the seal carrier during operation of the turbomachine or the gas turbine, several of the wall segments 60 are designed with damping portions 62, in the form here of slot-shaped openings 62 by way of example. The slot-shaped openings 62 in this case are designed in a respective wall segment 60 that forms a common partition wall between two adjacent cavities 56. Due to the slot-shaped opening 62, the two adjacent cavities 56 stand in fluid connection with one another through the opening 62. As is visible from the illustration, the carrier base 52, which is arranged radially outside with respect to the damping portions 62 or the openings 62, is designed as continuous. In other words, no corresponding weakening or segmenting or separation by means of a parting line is provided in the carrier base 52 in the regions having damping portions 62 or slot-shaped openings 62.

By providing slot-shaped openings 62 in the seal body 54, the flow of force can be influenced inside the seal body 54, particularly in the peripheral direction UR, so that deformations due to thermal gradients can be prevented or reduced. The slot-shaped openings 62 can be designed or dimensioned in such a way that the fluid connection that forms thereby between the cavities 56 has little or no influence on the intended sealing effect of the seal carrier 52.

The slot-shaped openings 62 can extend radially outward proceeding from a radially inner-lying edge 64 of the wall segment 60. In this case, in the radial direction RR, the slot-shaped opening 62 can have a slot length SL that is shorter than the radial height RH of the wall segment 60, particularly approximately 70% to 99% of the radial height RH. However, slot lengths SL that are the same size as the radial height RH are also conceivable.

FIGS. 4 to 7 show the cavities 56 of the seal body 54 in schematic, simplified illustrations. Respective slot-shaped opening 62 that are formed in a relevant wall segment 60 between two adjacent cavities 56 are indicated schematically by dotted lines.

Figure 4:
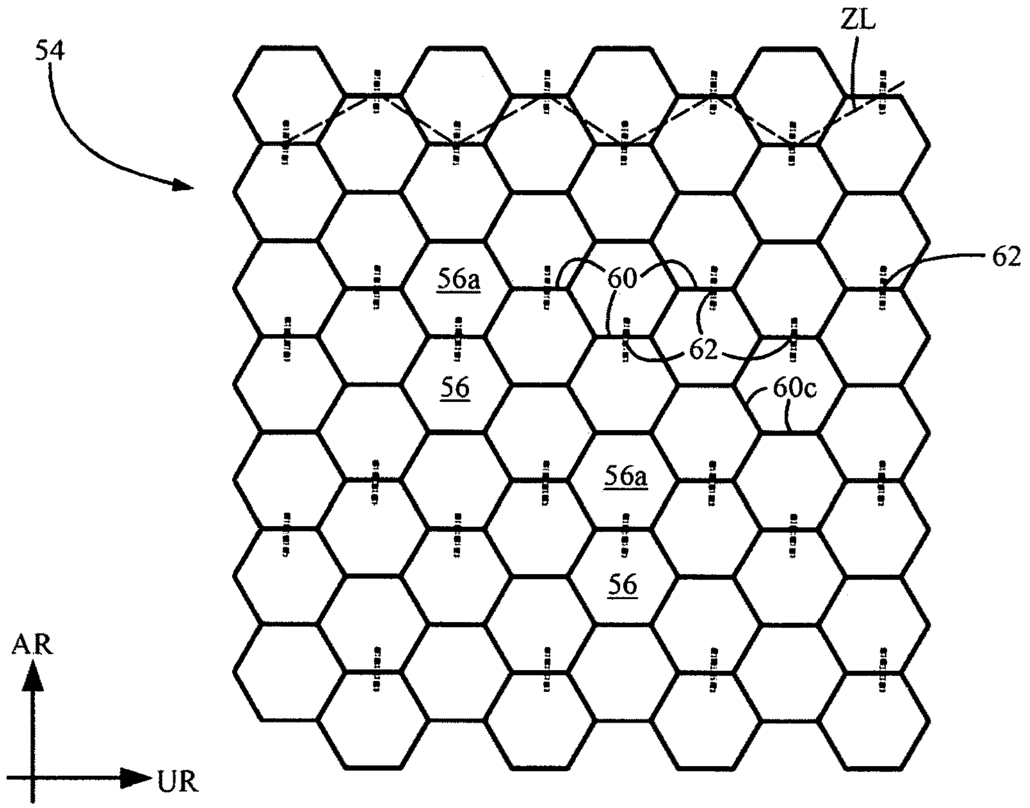
FIG. 4 shows, in a simplified schematic illustration, the arrangement of slot-shaped openings in a seal body.

In the embodiment of FIG. 4, the slot-shaped openings 62 are arranged in such a way that a cavity 56 stands in fluid connection only with a single adjacent cavity 56*a*. In this case, the sequence of the arrangement of slot-shaped openings 62 has a kind of zigzag line ZL in the peripheral direction UR. The slot-shaped openings 62 are arranged along a plurality of essentially parallel zigzag lines ZL.

Figure 5:
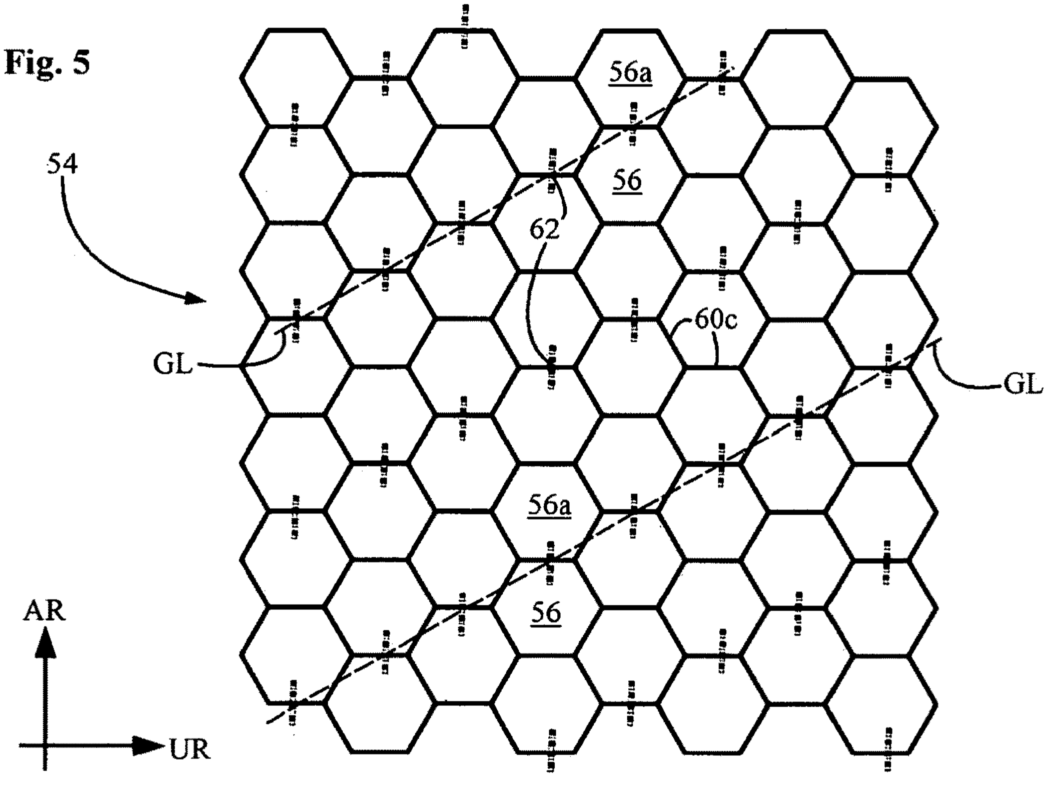
FIG. 5 shows, in a simplified schematic illustration, the arrangement of slot-shaped openings in a seal body.

In the embodiment of FIG. 5, the slot-shaped openings 62 are also arranged in such a way that a cavity 56 stands in fluid connection only with a single adjacent cavity 56*a*. In this case, the sequence of the arrangement of slot-shaped openings 62 forms an inclined line GL with respect to the peripheral direction UR. The slot-shaped openings 62 are arranged along a plurality of essentially parallel GL lines.

Figure 6:
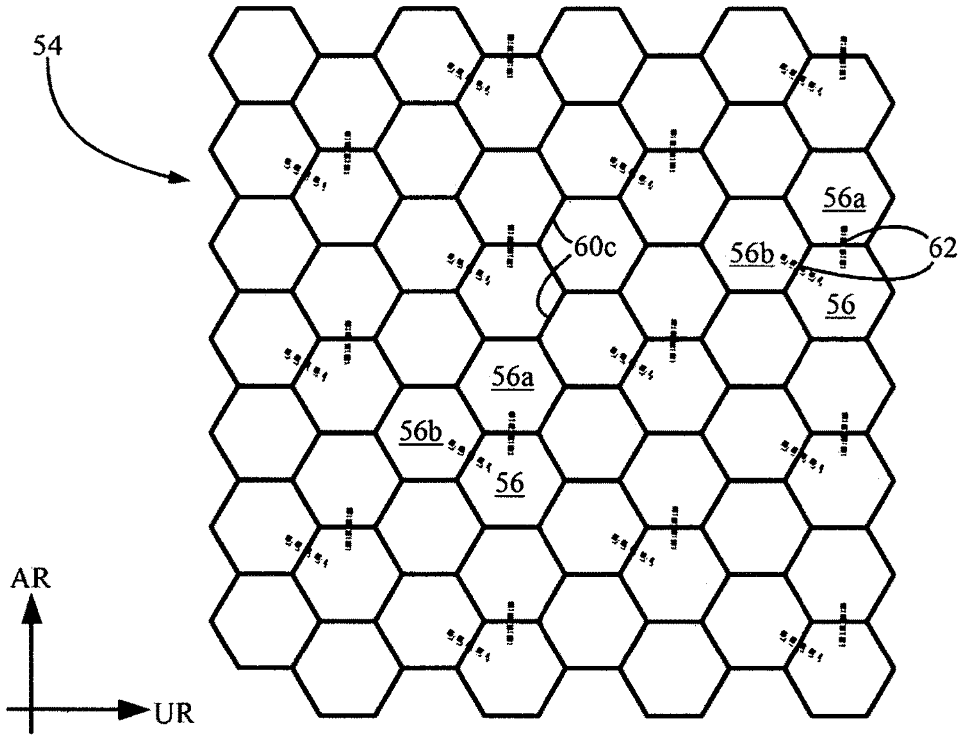
FIG. 6 shows, in a simplified schematic illustration, the arrangement of slot-shaped openings in a seal body.

In the embodiment of FIG. 6, the slot-shaped openings 62 are arranged in such a way that one cavity 56 stands in fluid connection with a plurality, here two, for example, adjacent cavities 56*a*, 56*b*. In particular, the slot-shaped openings 62 are arranged in wall segments 60 adjacent to the same cavity 56.

Figure 7:
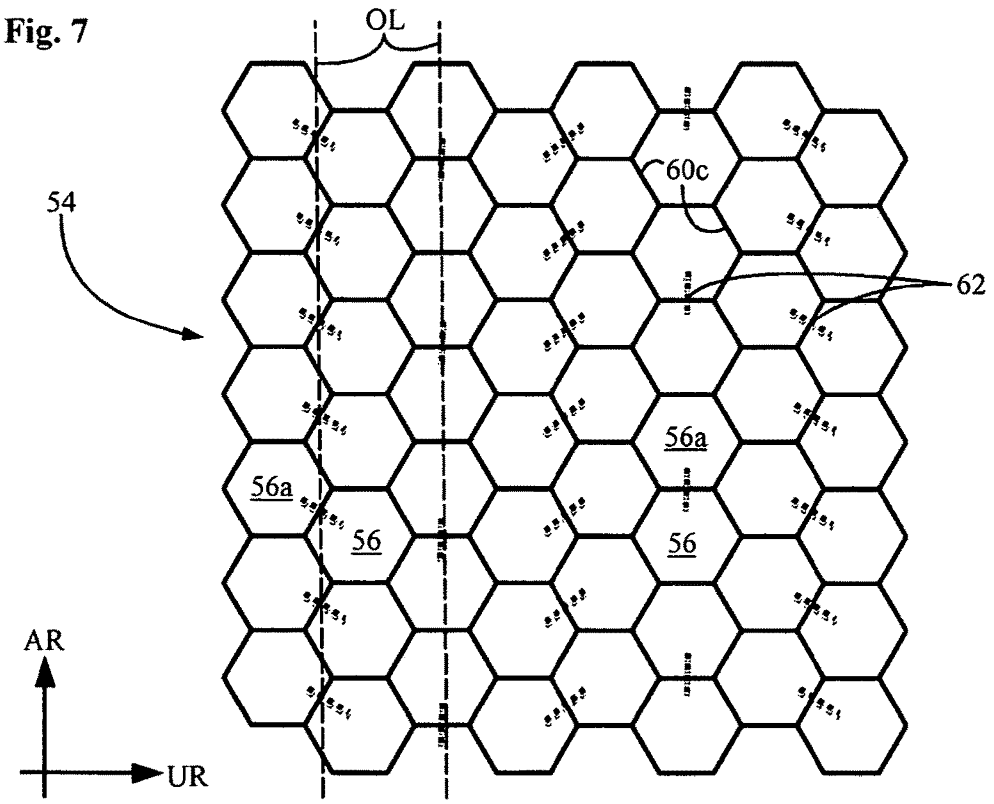
FIG. 7 shows, in a simplified schematic illustration, the arrangement of slot-shaped openings in a seal body.

In the embodiment of FIG. 7, the slot-shaped openings 62 are also arranged in such a way that one cavity 56 stands in fluid connection only with a single adjacent cavity 56*a*. In this case, the sequence of the arrangement of slot-shaped openings 62 forms an orthogonal line OL with respect to the peripheral direction UR. The slot-shaped openings 62 are arranged along a plurality of essentially parallel OL lines.

Another embodiment can be derived from FIG. 3. One cavity 56 there is also connected to a plurality of adjacent cavities 56 (as in FIG. 6). Of course, the slot-shaped openings 62 are arranged at opposite-lying wall segments 60 of the cavity 56.

FIGS. 8A and 8B show by way of example that the seal body 54 does not absolutely need to have honeycomb-shaped cavities 56. Rather, pentagonal cavities 56 can be provided as in FIG. 8A or cavities 56 in the form of a notched directional arrow can be provided as in FIG. 8B. Also, in these differently shaped cavities 56, adjacent cavities can stand in fluid connection with one another by means of a slot-shaped opening 62. Of course, other shapes for the cavities or for the cavity walls are also conceivable, for example triangular or rectangular shapes, or a combination of different shapes.

FIG. 9 shows an alternative embodiment of the damping portions 62 in the seal body 54. In this embodiment, the damping portions 62 are formed by overlapping wall segments 60*a*, 60*b* of cavities 56 adjacent to one another. In this case, the overlapping wall segments 60*a*, 60*b* can lie directly adjacent, which improves the sealing effect of the seal body 54. Alternatively, a smaller or minimum gap also can be formed between the overlapping wall segments 60*a*, 60*b*. The overlapping wall segments 60*a*, 60*b* additionally serve for disrupting the flow of force. As has already been explained with reference to FIGS. 3 to 7, for example, overlapping wall segments 60*a*, 60*b* that are not parallel to the peripheral direction UR also can be provided, which is shown in the lower right region of FIG. 9. Also in this embodiment, the carrier base 52 is designed to be continuous in the region of the damping portions 62.

For all described embodiments of FIGS. 3 to 9, the openings 62 can be arranged distributed on the seal body 54 in such a way that there is a plurality of adjacent cavities 56, between which a continuous wall segment 60*c* (FIGS. 3 to 9) is formed, so that these adjacent cavities 56 do not stand in fluid connection with one another.

What is claimed is:

1. A seal carrier for a gas turbine, comprising:

a carrier base and at least one seal body, wherein the at least one seal body is connected to the carrier base, and wherein the at least one seal body is formed by a plurality of cavities arranged next to one another, uniformly, in the peripheral direction and in the axial direction, wherein the plurality of cavities extend out from the carrier base in the radial direction and are delimited by a cavity wall, wherein the seal body has a plurality of damping portions configured and arranged to locally dampen or disrupt the flow of force in the seal body, the damping portions being configured and arranged as slot-shaped openings, each cavity of the plurality of cavities standing in fluid connection over a slot-shaped opening with at most one adjacent cavity thereto, wherein the carrier base is configured and arranged as continuous in the region of the damping portions.

2. The seal carrier according to claim 1, wherein at least one of the slot-shaped openings is provided in a wall segment of the cavity wall that forms a common partition wall between the two adjacent cavities.

3. The seal carrier according to claim 1, wherein at least one of the slot-shaped openings extends radially outward proceeding from a radially inner-lying edge of the wall segment.

4. The seal carrier according to claim 3, wherein, in the radial direction, at least one of the slot-shaped openings has a slot length that is shorter than the radial height of the wall segment, approximately 70% to 99% of the radial height, or is of the same size as the radial height of the wall segment.

5. The seal carrier according to claim 1, wherein the slot-shaped openings are arranged distributed on the seal body so there is a plurality of adjacent cavities between which a continuous wall segment is formed, wherein the adjacent cavities do not stand in fluid connection with one another.

6. The seal carrier according to claim 1, wherein the carrier base and the seal body are configured and arranged as semicircular-shaped sealing segments, wherein two sealing segments form a circumferential seal.

7. An aircraft gas turbine, having at least one rotating blade ring, and having at least one seal carrier according to claim 1, the seal carrier being arranged around the rotating blade ring.

* * * * *